May 26, 1964
G. M. TETER
3,134,890
THERMAL FEED BACK FOR PRECISION TEMPERATURE
CONTROL OF WATER HEATERS
Filed Aug. 15, 1962
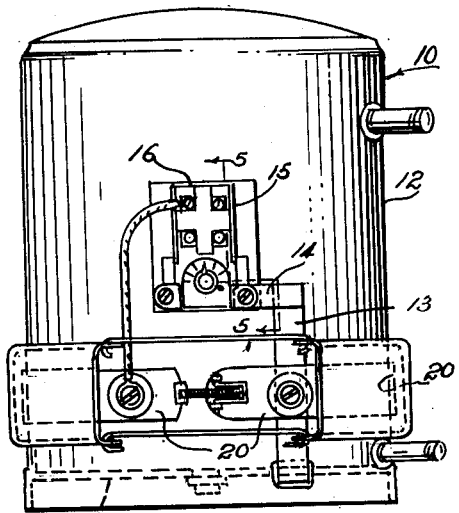
Fig. 1.
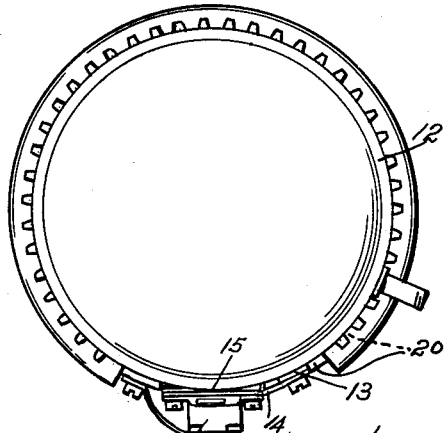
Fig. 2.
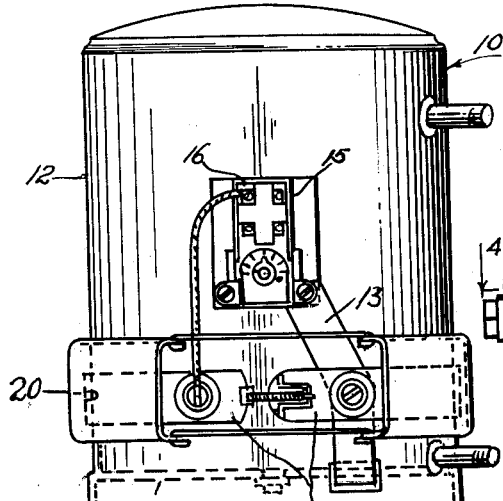
Fig. 3.
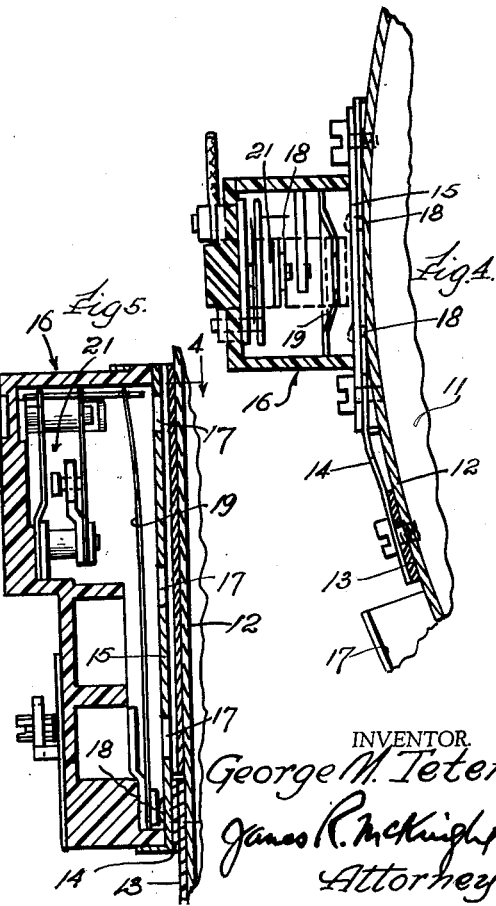
Fig. 4.
Fig. 5.
Fig. 6.
Fig. 7.
INVENTOR.
George M. Teter,
James R. McKnight
Attorney.

United States Patent Office 3,134,890
Patented May 26, 1964

3,134,890
THERMAL FEED BACK FOR PRECISION TEMPERATURE CONTROL OF WATER HEATERS
George M. Teter, 13901 S. Indiana Ave., Chicago, Ill.
Filed Aug. 15, 1962, Ser. No. 217,057
2 Claims. (Cl. 219—523)

My invention relates to a thermal feed back for precision temperature control of water heaters.

Heretofore, the thermostat in a water heater has operated only by the heat of the water tank. This resulted in delays in operation and uneven water temperatures.

It is among the objects of my invention to solve these problems and to provide means for insuring precision water temperature.

Another object is to create a thermal feed back for water heaters that will provide accurate thermostat control and expedited action in operating the heating means with a minimum of delay.

My invention also contemplates such other objects, advantages and capabilities as will later more fully appear, and which are inherently possessed by my invention.

While I have shown in the accompanying drawings a preferred embodiment of my invention, yet it is to be understood that the same is susceptible of modification and change without departing from the spirit of my invention.

Referring to the drawings, FIG. 1 is a front elevational view of the preferred form of my thermal feed back in a water heater; FIG. 2 is a top plan view of the same; FIG. 3 is a front elevational view of the modified form of my thermal feed back in a water heater; FIG. 4 is a detailed sectional view on line 4—4 of FIG. 5; FIG. 5 is an enlarged vertical sectional view on line 5—5 of FIG. 1; FIG. 6 is a detailed view of my strip and shunt; and FIG. 7 is a detailed view of my modified strip.

The preferred embodiment selected to illustrate my invention comprises a tank 10 preferably metal and adapted to hold water to be heated. My tank has a closed bottom 11 and a surrounding side wall 12. A metal strip 13 preferably of copper is attached only at its lower portion by soldering to side wall 12 of tank 10 adjacent bottom 11 and extending below the water lever of the tank. Above the soldering, strip 13 is not attached to side wall 12. Metal shunt member 14 is attached adjacent one end by soldering to the upper portion of strip 13 and extends to and contacts the metal back 15 of thermostat 16 which is attached to an upper portion of side wall 12. Back 15 has a plurality of spaced openings 17. Back 15 is attached by rivets 18 to bi-metallic temperature sensitive member 19.

A metallic heating element 20 is clamped to side wall 12 and extends over a portion of strip 13, and when on supplies heat to strip 13.

Heating element 20 and thermostat 16 are each connected by suitable means to an electrical source of supply and to each other.

Tank 10 may be open or closed by a suitable cover. It is provided with suitable means for water inlet and also for water outlet.

Temperature sensitive member 19 is operable by differences in heat to move to and away from contact with switch 21. Thermostat 16 is set so that upon a certain temperature being reached temperature sensitive member 19 will move in contact with switch 21 to turn on the operating of heating element 20. Conversely, thermostat 16 is also set so that upon a certain temperature being reached on temperature sensitive member 19 it will move away from contact with switch 21 so as to turn off heating element 20.

For instance, when heating element 20 is on so that the water in the tank 10 is heated, sensitive member 19 receives not only heat from the water in the tank, but also from strip 13 through shunt 14. The result is that the added heat on sensitive member 19 moves it away from contact with switch 21 faster to turn off heating element 20, than if it were merely activated by the heat of the water tank alone. This minimizes or eliminates the thermal delay existing in prior conventional devices, and affords more accurate temperature control.

When the heating element 20 is off, it does not supply heat to metal strip 13. Since strip 13 extends below the water level of the tank, so that the temperature there is not heated by any water and is cooler, strip 13 through shunt 14 expedites the moving of temperature sensitive member 19 against switch 21 for turning on the heating element 20 for immediate warming of the water. This makes for faster operation and prompt action. Thermal delay or lag is thereby substantially reduced. The result is that the water is retained hot and at substantially a uniform temperature and wide variations in temperature are avoided. Precision adjustments may be determined and maintained.

In another embodiment of my invention, I may omit shunt 14 by extending the upper free portion of strip 13 so that it contacts back 15 and affects temperature sensitive member 19 of thermostat 16.

By varying the width or thickness of the strip 13, and of shunt 14 when used, the amount of feed back may be determined to obtain the precision of control desired.

With my strip 13, either with or without shunt 14, thermostat 16 operates on the combination of heat from the water in the tank and the heat fed back by the strip and/or shunt. This permits greater precision operation. With my device there are minimum temperature differentials and more accurate control.

Having thus described my invention, I claim:

1. A temperature controlled water heater comprising a tank adapted to hold water, an electrical heating element atached to the exterior of said tank and connected to an electrical source of supply, a thermostat mounted on the exterior of said tank and having an off and on switch and connected to said heating element and to said electrical source of supply, said thermostat also having a temperature sensitive member for operating said off and on switch, a metal strip attached at its lower portion to the exterior of said tank, said heating element extending over a portion of said metal strip and supplying heat when on to said metal strip, the upper portion of said metal strip contacting said thermostat and relaying heat to said temperature sensitive member to move it away from contact with said switch when a certain temperature has been reached to turn off said heating element, said metal strip being attached to the lower portion of said tank adjacent the bottom of said tank so that when said heating element is off and not supplying heat to said metal strip and said metal strip is cooler, said metal strip will be further cooled by its said attachment to said tank and will pass on its coolness to said temperature sensitive member so that when a certain temperature has been reached, said temperature sensitive member will move in contact with said switch for turning on said heating element.

2. A temperature controlled water heater comprising a tank adapted to hold water, an electrical heating element attached to the exterior of said tank and connected to an electrical source of supply, a thermostat mounted on the exterior of said tank and having an off and on switch and connected to said heating element and to said electrical source of supply, said thermostat also having a temperature sensitive member for operating said off and on switch, a metal strip attached at its lower portion to the exterior of said tank, a metal shunt attached at its one end to said metal strip, said heating element extending over a portion of said metal strip and supplying heat when on to said metal strip and said metal shunt, the other of said metal shunt contacting said thermostat and relaying heat to said temperature sensitive member to move it away from contact with said switch when a certain temperature has been reached to turn off said heating element, said metal strip being attached to the lower portion of said tank adjacent the bottom of said tank so that when said heating element if off and not supplying heat to said metal strip and said metal strip is cooler, said metal strip will be further cooled by its said attachment to said tank and will pass on its coolness by said metal shunt to said temperature sensitive member so that when a certain temperature has been reached, said temperature sensitive member will move in contact with said switch for turning on said heating element.

References Cited in the file of this patent

UNITED STATES PATENTS

| | | |
|---|---|---|
| 1,533,291 | Woodson | Apr. 14, 1925 |
| 1,698,596 | Hynes | Jan. 8, 1929 |
| 2,701,295 | Andrews | Feb. 1, 1955 |
| 2,767,925 | Arnold | Oct. 23, 1956 |
| 3,059,092 | Olson | Oct. 16, 1962 |